United States Patent
Bresso et al.

(10) Patent No.: US 9,377,075 B2
(45) Date of Patent: Jun. 28, 2016

(54) SEALING ASSEMBLY ADAPTED TO BE INSERTED BETWEEN TWO RELATIVELY SLIDABLE MEMBERS

(71) Applicant: Aktiebolaget SKF, Göteborg (SE)

(72) Inventors: Marco Bresso, Turin (IT); Francesco Scaramozzino, Villanova d'Asti Asti (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/296,043

(22) Filed: Jun. 4, 2014

(65) Prior Publication Data
US 2015/0008647 A1    Jan. 8, 2015

(30) Foreign Application Priority Data
Jun. 4, 2013   (IT) ............................. TO2013A0460

(51) Int. Cl.
*F16J 15/32*    (2006.01)
*F16F 9/36*     (2006.01)

(52) U.S. Cl.
CPC ............. *F16F 9/362* (2013.01); *F16J 15/3232* (2013.01); *F16J 15/3236* (2013.01); *F16J 15/3268* (2013.01); *F16F 2226/044* (2013.01)

(58) Field of Classification Search
CPC . F16J 15/3268; F16J 15/3232; F16J 15/3236; F16J 15/3228; F16J 15/3256; F16F 9/362; F16F 2226/044; F16L 7/02; F16L 11/12
USPC ................................................ 277/551, 572
See application file for complete search history.

(56) References Cited

U.S. PATENT DOCUMENTS

| | | | | |
|---|---|---|---|---|
| 3,020,055 A | | 2/1962 | Allinquant | |
| 4,261,583 A | * | 4/1981 | de Vries et al. | 277/550 |
| 4,280,741 A | * | 7/1981 | Stoll | 384/16 |
| 4,759,265 A | * | 7/1988 | Stoll et al. | 92/153 |
| 5,165,700 A | * | 11/1992 | Stoll | F16J 15/3232 277/550 |
| 5,897,119 A | * | 4/1999 | McMillen | F16J 15/3236 277/562 |
| 7,677,579 B2 | * | 3/2010 | Bell | F16L 7/02 277/607 |
| 8,312,805 B1 | * | 11/2012 | Blume | F04B 53/143 277/560 |
| 8,387,990 B2 | * | 3/2013 | Castleman | F16J 15/3236 277/309 |
| 2009/0028479 A1 | * | 1/2009 | Dittmann | 384/275 |

FOREIGN PATENT DOCUMENTS

| | | |
|---|---|---|
| DE | 102011082007 B3 | 1/2013 |
| DE | 102011084422 A1 | 4/2013 |
| EP | 2589842 A1 | 5/2013 |

* cited by examiner

*Primary Examiner* — Kristina Fulton
*Assistant Examiner* — Nathan Cumar
(74) *Attorney, Agent, or Firm* — Bryan Peckjian; SKF USA Inc. Patent Dept.

(57) ABSTRACT

A sealing assembly insertable between a rod and a guiding bush of a shock absorber to form a sealing and guiding unit for the rod is provided. The assembly includes an elastomeric ring having a first and a second annular lip which extend axially and radially overhanging; and a reinforcing ring integrally coupled to the elastomeric ring, radially on the side of the first and of the second sealing lip. The reinforcing ring is integrally coupled in one piece with the elastomeric ring, on the exterior of the elastomeric ring and on the side of a lateral surface thereof facing towards the lips, the reinforcing ring coupling in sliding manner with the rod to serve as guide therefor. The sealing ring coupling by interference with the guiding bush.

7 Claims, 1 Drawing Sheet

SEALING ASSEMBLY ADAPTED TO BE INSERTED BETWEEN TWO RELATIVELY SLIDABLE MEMBERS

CROSS-REFERENCE TO RELATED APPLICATIONS

This application claims priority to Italian Patent Application No. TO2013A000460 filed on Jun. 4, 2013.

FIELD OF THE INVENTION

The present invention relates to a sealing assembly which is adapted to be inserted between a first and a second mechanical member which are relatively moving in linear reciprocating manner, in particular adapted to be inserted between a rod and a guiding bush of a shock absorber. The invention also relates to a guiding and hydraulic sealing unit for a rod of a shock absorber using such a sealing assembly.

BACKGROUND OF THE INVENTION

Sealing units are known from DE102011084422A1, which are insertable between a shock absorber rod and a bush which is coupled to the shock absorber body, and comprising a sealing ring provided with a dust lip facing in use the external environment and with a sealing lip facing towards the internal environment of the shock absorber body, and a reinforcing ring coupled with the sealing ring to improve the sealing action of one or both the lips, which slide in use on the rod.

This type of sealing assemblies should be used in combination with a guiding ring for the shock absorber rod and with a further component, usually defined by an O-ring, intended to serve as "energizer" for the guiding ring, that is to cooperate in contact with the guiding ring in its housing seat on the bush to keep the bush and the rod substantially coaxial, while allowing those small lateral movements subsequent to operating vibrations and any clearances due to processing tolerances.

The assembly of guiding and sealing units for shock absorber rods requires therefore assembly on the component (bush) that is coupled to the shock absorber body of at least three different components, consisting of the sealing assembly, the guiding ring and the O-ring.

This makes assembly operations more complex and costly, increases the volumes and weight of the guiding and sealing units and makes it difficult to manage the logistics of the various components.

EP2589842 does not solve these problems.

SUMMARY OF THE INVENTION

It is the object of the present invention to provide a sealing assembly insertable between a first and a second mechanical member relatively moving in linear reciprocating manner, in particular insertable between a rod and a guiding bush of a shock absorber, without the aforesaid drawbacks, and which allows a guiding and sealing unit to be made with reduced volume and weight, simplifying the managing of the logistics of the components and reducing costs, while ensuring a sealing action that is equal to or better than the one obtainable with the solutions from the state of the art.

Based on the invention, a sealing assembly insertable between a first and a second mechanical member relatively moving in linear reciprocating manner, in particular insertable between a rod and a guiding bush of a shock absorber, and a guiding and sealing unit for a shock absorber rod, are obtained, having the features stated in the appended claims.

According to the invention, the functions of the three separate components of the state of the art, sealing assembly, guiding ring and O-ring, are all grouped into one component consisting of a sealing assembly, specifically studied and radically modified with respect, for example, to the one described in DE102011084422A1, thus not only resulting in a radical simplification and reduction of the number of components required, but also in a synergetic effect which improves the sealing action.

BRIEF DESCRIPTION OF THE DRAWINGS

The present invention will now be described with reference to the accompanying drawings, which illustrate a non-limiting exemplary embodiment thereof, in which.

DETAILED DESCRIPTION

Figure 1:
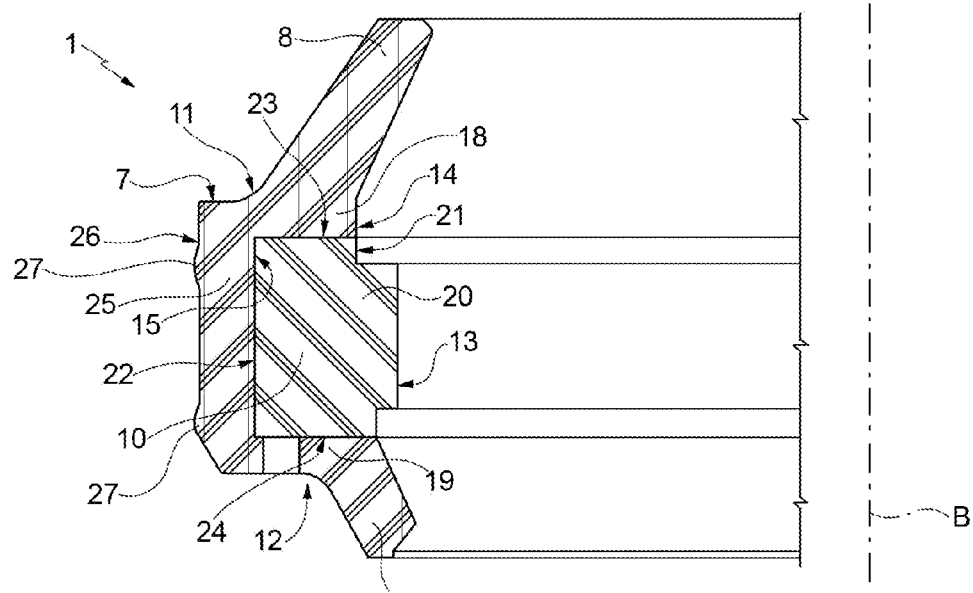
FIG. 1 diagrammatically shows the radial section of a sealing assembly made according to the invention, shown diametrically truncated, because axisymmetric.
Figure 2:
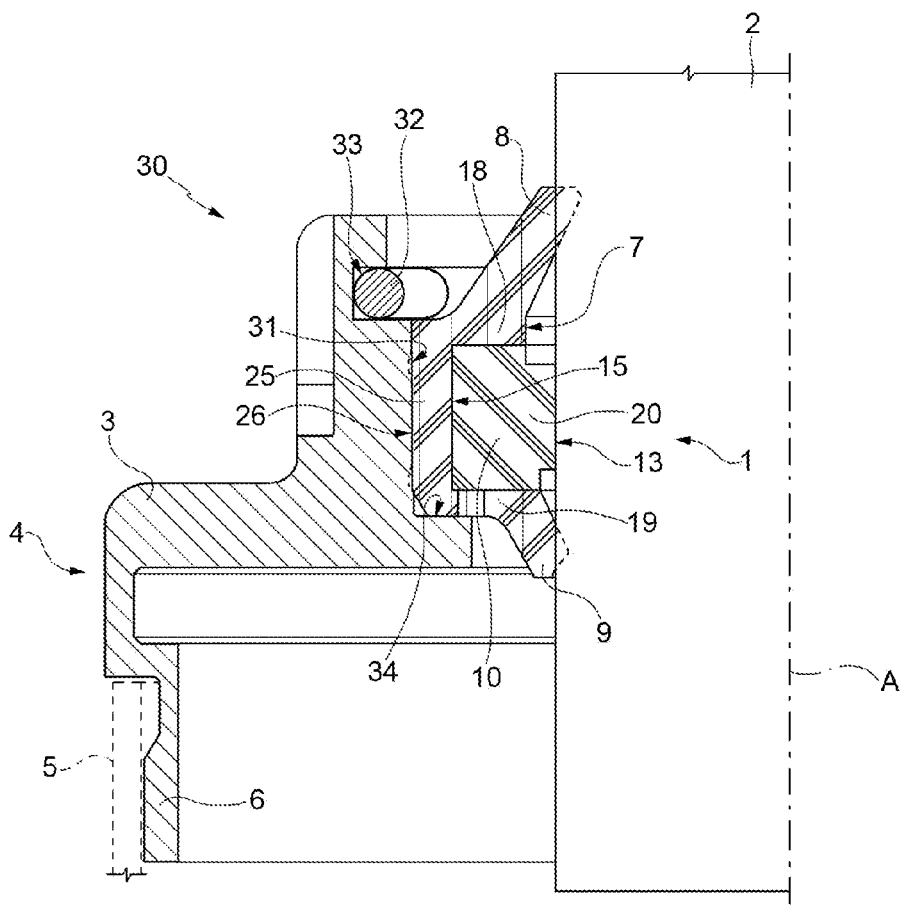
FIG. 2 diagrammatically shows a guiding and sealing unit for a shock absorber rod made according to the invention, using the sealing assembly in FIG. 1, also shown truncated at the axis of symmetry, because axisymmetric.

Numeral 1 in FIG. 1 indicates a sealing assembly adapted to be inserted (FIG. 2) between a first mechanical member 2 and a second mechanical member 3 relatively moving in linear reciprocating manner, in particular between a shock absorber rod 2, which is stationary in the non-limiting embodiment shown, and a guiding bush 3, which, in the non-limiting embodiment shown, is axially mobile along an axis of symmetry A thereof which also coincides with the axis of symmetry of rod 2, which is coaxial to bush 3. In the example shown, rod 2 and bush 3 are part of a shock absorber 4, for the other pars thereof t being of known type, of which for simplicity, only a part is shown of rod 2, of bush 3 and of a shock absorber body 5, which in use is integrally secured fluid-tightly to a side wall 6 of bush 3.

The sealing assembly 1, which is axisymmetric with respect to an axis B thereof (FIG. 1) in use arranged coaxial with axis A, comprises a sealing ring 7 integrally coupled, as explained below, with bush 3 and is made of an elastomeric material; the sealing ring 7 comprises at least a first elastically deformable annular sealing lip 8 and a second elastically deformable annular sealing lip 9; obviously, the sealing ring 7 may have more than two sealing lips, arranged differently according to configurations known as a whole and which therefore are not disclosed for simplicity. The sealing assembly 1 also comprises a reinforcing ring 10 integrally coupled to the sealing ring 7 and made of a harder material than the material used to make ring 7, e.g. made of a synthetic plastic material.

The lips 8, 9 extend at least in part axially and radially overhanging from the sealing ring 7, the first lip starting from a first axial end 11 of the sealing ring 7 and the second lip starting from a second axial end 12 of the sealing ring 7, opposite to the first end 11, and the reinforcing ring 10 is coupled, as explained below, with the sealing ring 7 radially on the side of the lips 8 and 9.

According to a first and most important feature of the invention, the reinforcing ring 10 has dimensions, a radially innermost diameter in the non-limiting case disclosed, such as to be adapted to couple with the stationary member 2 (rod 2 of the shock absorber 4, FIG. 2, in the non-limiting example shown) in sliding manner in use to serve directly as guide for the relative sliding between the members 2 and 3. Substantially, while in the state of the art the sealing assemblies possibly could have incorporated a more rigid annular element serving solely functions of mechanical support, according to the invention ring 10 also and especially serves as a guiding ring or bush, in use, for/on rod 2, with which ring 10 cooperates in direct contact and in sliding manner. Obviously, the descriptions above and below are also valid in the dual case in which rod 2 represents the axially mobile member and bush 3 represents the stationary member.

To this end, the reinforcing ring 10 is made, at least at a radially innermost sliding lateral surface 13, towards the sliding member 2, of a low-friction coefficient synthetic material, e.g. of a fluorinated polymer, whether or not elastomeric, in any case more rigid than the elastomeric material with which ring 7 and the relative annular lips 8 and 9 are made. Obviously, both the sealing ring 7 with the relative lips 8, 9 and the reinforcing and guiding ring 10 may each be made with two or more different materials, having different physical-mechanical features, which are co-moulded or in another manner chemically and/or physically connected together.

In any case, according to a further feature of the invention, ring 10 is not simply juxtaposed to ring 7, as instead occurs in the embodiment of the sealing assembly in DE102011084422A1, but is instead coupled integrally in one piece with the sealing ring 7, the term "integrally in one piece" meaning that ring 10, together with the sealing ring 7, defines one unique, indivisible and inseparable component. The insolubility of the union between the two components 7 and 10 is obtained in known manner during the vulcanizing step of the sealing ring 7, thus forming, by compression moulding, the sealing ring 7 directly on ring 10 previously arranged in the mould.

As shown, ring 10 is integrally coupled in one piece with the sealing ring 7, on the exterior of the sealing ring 7 and radially on the inside of the sealing ring 7, on the side of a first cylindrical and radially innermost radial lateral surface 14 of the sealing ring 7 (FIG. 1) facing the same side as the overhanging radial extension of the lips 8 and 9. The known process of indissoluble chemical and physical union between the components 7 and 10 described above is indicated in the art as "gluing in the step of vulcanizing", according to a known process, used for securing elastomeric sealing elements on the screens of cassette seals.

The material(s) used to make ring 10 is/are therefore selected so as to be suitable for supporting the vulcanizing pressures and temperature.

According to a further feature of the invention, the sealing ring 7 has such dimensions, in the case disclosed an outer diameter, to be coupled by interference in use with the axially mobile stationary member 3 at least in correspondence with the whole of the reinforcing and guiding ring 10; and, in combination, the annular lips 8, 9 are adapted to cooperate, in use, with the stationary member 2, both in sliding manner, always one upstream and the other downstream of the reinforcing ring 10, respectively, with respect to the relative sliding direction between rod 2 and the annular bush 3 crossed thereby in use; in other words, the annular lips 8 and 9 cooperate with rod 2 axially at opposite sides of the reinforcing ring 10.

According to the invention, ring 10 is accommodated inside an annular seat 15 obtained on the radial lateral surface 14 of the sealing ring 7, and delimited between the first 8 and the second 9 lips.

The reinforcing ring 10 and the annular seat 15 in which the reinforcing ring 10 is inserted and is integrally secured in one piece are shaped in such a manner that the reinforcing ring 10 extends in radial direction directly "underneath", considering an axial direction parallel to axis B, of respective root portion 18 of lip 8 and root portion 19 of lip 9, which root portions 18, 19 are arranged immediately adjacent to the annular seat 15, between it and the lips 8 and 9, respectively, so as to flank, in axial direction, seat 15 and ring 10 which is blocked therein.

In the non-limiting embodiment disclosed, the lips 8 and 9 extend overhanging radially on the inside of the sealing ring 7 and lip 8 is longer, in axial direction, than lip 9 and is facing in use towards the external environment of the shock absorber body 5 and of the shock absorber 4 as a whole, thus forming a dust lip. Lip 9 is instead facing in use towards the inside of the shock absorber body 5 and constitutes the true sealing lip of the sealing assembly 1, against oil and/or air present in use within body 5. The lips 8 and 9 are also arranged wide apart from each other, so as to reciprocally separate from each other more and more as they near axis B.

Obviously, lips 8 and 9 could have different relative dimensions, according to the sealing needs to be met, and be equal in length, or lip 8 could be the shorter one.

The reinforcing ring 10, which consists of a solid annular block made of synthetic material having a substantially quadrangular radial section, is preferably provided, radially on the inside, with an annular projection 20, which protrudes radially overhanging inside the sealing ring 7, in the space between lips 8 and 9, but for a smaller radial extension than the radial overhanging extension of the lips 8 and 9, and which is delimited radially towards the inside, therefore on the side of the first lip 8 and of the second lip 9, by the sliding and coupling cylindrical surface 13 slidingly coupled in use with rod 2.

The annular projection 20 and the respective radially innermost lateral cylindrical sliding surface 13, slidingly coupled with rod 2 in use, have a smaller axial extension than that of the rest of the reinforcing ring 10, which is delimited, on the side of the lips 8 and 9, by a radially innermost lateral cylindrical surface 21 (FIG. 1) from which the annular projection 20 protrudes radially overhanging and which is arranged flush with the radial lateral surface 14 of the sealing ring 7.

Ring 10 is further delimited by a radially outermost cylindrical lateral surface 22, parallel and opposite to surface 14, and by a pair of opposite flat frontal surfaces 23 and 24 arranged adjacent to, and in contact with the root portions 18 and 19 of the lips 8 and 9, for the whole length, measured in radial direction, of the lips 8 and 9; the reinforcing ring 10 is therefore entirely embedded in the sealing ring 7, chemically and mechanically restrained integrally thereto, except for the annular projection 20 thereof and the radially inner lateral cylindrical surface 21 thereof from which the annular projection 20 protrudes and which is the only surface of ring 10 which is not in contact with, and connected to the elastomeric material of ring 7.

More generally, the annular projection 20 radially protrudes from the sealing ring 7 and is delimited, on the side of the first and of the second lips, by a lateral cylindrical sliding surface 13 having an axial extension which is smaller than that of the rest of the reinforcing ring 10, which is delimited by: a first lateral cylindrical surface 21) from which the annular projection 20 radially overhangs and which is arranged flushed with the first radial lateral surface (14) of the sealing ring 7; by a second cylindrical lateral surface 22 opposite to the first; and by the pair of opposite frontal flat surfaces 23,24; the reinforcing ring (10) being entirely embedded in the sealing ring 7, except for the annular projection 20 and the first cylindrical lateral surface 13 from which the annular projection protrudes.

It is if fact to be understood that, in an embodiment not shown but which is obvious for the skilled in the art, lips 8, 9 and projection 20 can be arranged on the side of the radially outermost lateral surface 22, instead of on the side of the radially innermost lateral surface 14, as in the non limitative embodiment shown.

The root portions 18 and 19 of the lips 8 and 9 have axial extension essentially identical to each other and essentially equal to the radial extension of an annular portion 25 of the sealing ring 7 arranged radially on the side opposite to the radial lateral surface 14 and immediately adjacent to the reinforcing ring 10; the annular portion 25 is delimited radially on the outside by a second cylindrical radial lateral surface 26 of the sealing ring 7, opposite to surface 14, adapted to couple fluid-tightly and by interference in use with the mobile member defined by the annular bush 3. To this end, surface 26 is also provided with annual ribs or waving 27.

According to a further aspect of the invention, the sealing assembly 1 is part of a guiding and hydraulic sealing unit 30 (FIG. 2) for rod 2 of the shock absorber 4, which can be directly restrained with a single operation to the lateral wall of the shock absorber body 5, comprising an annular bush 3, which is fluid-tightly couplable with the shock absorber body 5, in known manner and therefore not disclosed for simplicity, the sealing assembly 1 described above, which is fluid-tightly driven into a radially innermost and axially through cup-shaped seat 31, of the annular bush 3 adapted to be crossed in use by the shock absorber rod 2, and an elastic ring 32 snappingly accommodated in an annular groove 33 of the cup-shaped seat 31 for axially blocking the sealing assembly 1 therein, against an axial shoulder 34 of the cup-shaped seat 31 obtained on the side of end 6 of the annular bush 3 facing the shock absorber body 5 in use; as it is clear from the Figures, the sealing assembly 1 is arranged sandwiched between the elastic ring 32, which is arranged at the inlet opening of the seat 31, and the axial shoulder 34 of the cup-shaped seat 31.

According to the invention and based on the above description, the lips 8 and 9 and at least one radially innermost portion of the reinforcing ring 10 (projection 20, in the case disclosed) radially and overhangingly protrude inside the cup-shaped seat 31 to cooperate in sliding manner in use with the shock absorber rod 2 crossing it. Shoulder 34 extends in radial direction, starting from surface 26, which is in direct contact with the lateral wall of seat 31, at least up to a portion which is substantially flush with surface 22 of the reinforcing and guiding ring 10, or just beyond it, towards axis A.

Not only does the sealing assembly 1 therefore serve a sealing purpose for the air/oil in the shock absorber body 5 and for the dust and contaminants external to the shock absorber 4, but it also serves the function of guiding, with low friction, the relative sliding of rod 2 through bush 3. The shape of bush 3 is therefore simplified and both its radial and axial dimensions are especially reduced. Indeed, the position and the reciprocal dimensions specifically selected for the lips 8, 9 and ring 10 allow the lips 8, 9 to perform the function of "energizing" elements for ring 10, performed before by a specific O-ring coupled radially externally to the guiding ring for rod 2, which was carried directly by bush 3 instead of, as in the present invention, directly by the sealing assembly 1 in turn carried, axially and radially blocked, in seat 34 of bush 3.

Finally, the presence of the surfaces 23, 24 arranged directly "underneath" the root portions 18, 19 of the lips 8, 9 provides the lips 8, 9 with excellent support for the frequent inversions of the mechanical stresses to which the lips 8, 9 are subjected due to the reciprocating motion between rod 2 and bush 3, thus, at the same time, leaving the lips 8, 9 with the maximum possibility of elastic deformation, which improves the sealing action thereof and reduces the wear thereof.

The invention claimed is:

1. A sealing assembly insertable between a first and a second mechanical member moving in linear reciprocating manner, insertable between a rod and a guiding bush of a shock absorber, the sealing assembly comprising:
   a sealing ring made of an elastomeric material and having at least a first and a second elastically deformable annular sealing lips that extend at least in part axially and radially overhanging from the sealing ring, the first lip starting from a first axial end of the sealing ring and the second lip starting from a second axial end of the sealing ring, opposite to the first end; and
   a reinforcing ring integrally coupled to the sealing ring, radially on the side of the first and second sealing lips; wherein:
   i) the reinforcing ring is integrally coupled in one piece with the sealing ring, on an exterior of the sealing ring and on the side of a first radial lateral surface of the sealing ring facing the same side as the first and second sealing lips;
   ii) the reinforcing ring is configured to couple in a sliding manner with the first member in order to guide the relative sliding between the first and the second member;
   iii) the sealing ring is configured in combination with the reinforcing ring to be coupled by interference with the second member; the first and the second annular sealing lips being adapted to cooperate, with the first member, both in sliding manner, on the opposite sides of the reinforcing ring and one upstream and the other downstream of the reinforcing ring with respect to a relative sliding direction between the first and the second member;
   iv) the reinforcing ring is integrally fixed in one piece to the sealing ring to define with the sealing ring a single, indivisible, inseparable component;
   v) the reinforcing ring has an annular projection which radially protrudes on the inside of the sealing ring, by a radial extension which is smaller than the overhanging radially extension of the first and second sealing lips; the annular projection being delimited, on the side of the first and of the second sealing lips, by a radially innermost lateral cylindrical sliding surface slidingly coupled in use with the first member; and
   vi) the reinforcing ring is delimited by: first and third lateral cylindrical surfaces from which the annular projection radially overhangs, the first lateral cylindrical surface arranged co-linear with the first radial lateral surface of the sealing ring, the third lateral cylindrical surface aligning with a surface of the sealing ring, and the first lateral cylindrical surface being radially offset from the third lateral cylindrical surface; by a second cylindrical lateral surface opposite to the first and third lateral cylindrical surfaces; and by a pair of opposite frontal flat surfaces; the reinforcing ring being entirely embedded in the sealing ring, except for the annular projection and the first and third cylindrical lateral surfaces from which the annular projection protrudes.

2. The sealing assembly according to claim 1, wherein the reinforcing ring is made at least partially of low-friction coefficient material and is accommodated in an annular seat disposed on the first radial lateral surface of the sealing ring, the annular seat being delimited between the first and the second sealing lips.

3. The sealing assembly according to claim 2, wherein the reinforcing ring is inserted in the annular seat for extending in radial direction directly between, according to an axial direction, respective root portions of the first and of the second sealing lip immediately adjacent to the annular seat.

4. The sealing assembly according to claim 3, wherein the first radial lateral surface of the sealing ring is a radially innermost surface, the first and the second sealing lips overhangingly extending radially on the inside of the sealing ring and the reinforcing ring having its annular projection arranged radially on the inside and which radially protrudes within the sealing ring.

5. The sealing assembly according to claim 4, wherein the pair of opposite frontal flat surfaces are arranged adjacent to, and in contact with, the root portions of the first and second sealing lips, for the whole length, measured in radial direction, of the root portions of the first and second sealing lips.

6. The sealing assembly according to claim 5, wherein, the root portions of the first and second sealing lips have axial extensions essentially identical to each other and essentially equal to a radial extension of an annular portion of the sealing ring radially arranged on the side opposite to the first radial lateral surface of the sealing ring, immediately adjacent to the reinforcing ring and delimited by a second radial lateral surface of the sealing ring opposite to the first radial lateral surface and adapted to couple fluid-tightly and by interference with the second member in use.

7. A guiding and hydraulic sealing unit for a rod of a shock absorber, comprising:
   an annular bush fluid-tightly couplable in use with a shock absorber body,
   a sealing assembly comprising:
      a sealing ring made of an elastomeric material and having at least a first and a second elastically deformable annular sealing lips that extend at least in part axially and radially overhanging from the sealing ring, the first lip starting from a first axial end of the sealing ring and the second lip starting from a second axial end of the sealing ring, opposite to the first end; and
      a reinforcing ring integrally coupled to the sealing ring, radially on the side of the first and second sealing lip; wherein:
      i) the reinforcing ring is integrally coupled in one piece with the sealing ring, on an exterior of the sealing ring and on the side of a first radial lateral surface of the sealing ring facing the same side as the first and second sealing lips;
      ii) the reinforcing ring is configured to couple in a sliding manner with the first member in order to guide the relative sliding between the first and the second member;
      iii) the sealing ring is configured in combination with the reinforcing ring to be coupled by interference with the second member; the first and the second annular sealing lips being adapted to cooperate, with the first member, both in sliding manner, on the opposite sides of the reinforcing ring and one upstream and the other downstream of the reinforcing ring with respect to a relative sliding direction between the first and the second member;
      iv) the reinforcing ring is integrally fixed in one piece to the sealing ring to define with the sealing ring a single, indivisible, inseparable component;
      v) the reinforcing ring has an annular projection which radially protrudes on the inside of the sealing ring, by a radial extension which is smaller than the overhanging radially extension of the first and second sealing lips; the annular projection being delimited, on the side of the first and of the second sealing lips, by a radially innermost lateral cylindrical sliding surface slidingly coupled in use with the first member;
      vi) the reinforcing ring is delimited by: first and third lateral cylindrical surfaces from which the annular projection radially overhangs, the first lateral cylindrical surface arranged co-linear with the first radial lateral surface of the sealing ring, the third lateral cylindrical surface aligning with a surface of the sealing ring, and the first lateral cylindrical surface being radially offset from the third lateral cylindrical surface; by a second cylindrical lateral surface opposite to the first and third lateral cylindrical surfaces; and by a pair of opposite frontal flat surfaces; the reinforcing ring being entirely embedded in the sealing ring, except for the annular projection and the first and third cylindrical lateral surfaces from which the annular projection protrudes, and wherein
   the sealing assembly is fluid-tightly driven into a radially innermost cup-shaped seat of the annular bush adapted to be crossed by the shock absorber rod, and an elastic ring snappingly accommodated in an annular groove of the cup-shaped seat to axially lock the sealing assembly in the cup-shaped seat, against an axial shoulder of the cup-shaped seat obtained on the side of an end of the annular bush facing the shock absorber body, the sealing assembly sandwiched between the elastic ring and the axial shoulder of the cup-shaped seat; wherein
   the first and the second lips and at least one radially innermost portion of the reinforcing ring radially and overhangingly protrude inside the cup-shaped seat to cooperate in sliding manner with the shock absorber rod.

* * * * *